United States Patent
Kathawala

[15] 3,678,166
[45] July 18, 1972

[54] THE TREATMENT OF INFLAMMATION WITH 1,2,3-BENZOTRIAZIN-4(3H)-ONES

[72] Inventor: Faizulla G. Kathawala, West Orange, N.J.
[73] Assignee: Sandoz-Wander, Inc., Hanover, N.J.
[22] Filed: March 15, 1971
[21] Appl. No.: 124,488

[52] U.S. Cl. ............................................................424/246
[51] Int. Cl. .........................................................A61k 27/00
[58] Field of Search.....................................................424/246

[56] References Cited

FOREIGN PATENTS OR APPLICATIONS

| 6,603,319 | 9/1967 | Netherlands |
| 6,702,189 | 8/1968 | Netherlands |

*Primary Examiner*—Stanley J. Friedman

[57] ABSTRACT

The disclosure relates to compounds of the class of 1,2,3-benzotriazin-4(3H)-ones which may be unsubstituted or substituted at the 6,7 and/or 8- positions, e.g. 6-chloro-1,2,3-benzotriazin-4(3H)-one, and their use as anti-inflammatory agents. The compounds may be prepared by reaction of an anthranil amide with sodium nitrite and a strong inorganic acid, e.g. sulfuric acid.

6 Claims, No Drawings

THE TREATMENT OF INFLAMMATION WITH 1,2,3-BENZOTRIAZIN-4(3H)-ONES

This invention relates to the use of chemical compounds which are 1,2,3-benzotriazin-4(3H)-ones as anti-inflammatory agents.

Compounds which are 1,2,3-benzotriazin-4(3H)-ones and either unsubstituted or substituted at the 6-position by halo or nitro are known in the prior art and certain of these have been mentioned as useful pharmaceutically as CNS depressants and sedatives, see Netherlands Pat. disclosures No. 67,02189 and No. 66,03319 published Aug. 8, 1968 and Sept. 18, 1967, respectively.

I have now found in accordance with the present invention that valuable anti-inflammatory properties are possessed by the compounds of the following formula I:

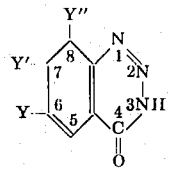

in which Y is hydrogen, halo of atomic weight of from 18 to 80, i.e., fluoro, chloro or bromo, lower alkoxy of 1 to 3 carbon atoms or nitro, each of Y' and Y" is hydrogen or lower alkoxy of 1 to 3 carbon atoms, or two of Y, Y' and Y" which are adjacent to each other together form
methylenedioxy; provided that Y' and Y" are each hydrogen when Y is halo or nitro.

The compounds of the formula I may be prepared by reacting a compound of the formula II

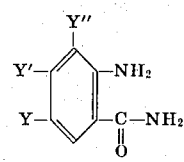

in which Y, Y' and Y" are as above defined, with a diazotization reagent in the presence of a strong acid.

The preparation of compounds I from compounds II is suitably carried out at temperatures in the range of from minus 30° C. to plus 20° C., typically minus 10° C. to plus 10° C. The diazotization reagent is desirably sodium nitrite and the acid employed is most suitably sulfuric acid. The reaction is of known type and the resulting reaction product of the formula I may be isolated from the resulting reaction mixture by working up by established procedures.

The compounds of the formula II may be prepared in accordance with the following reaction scheme:

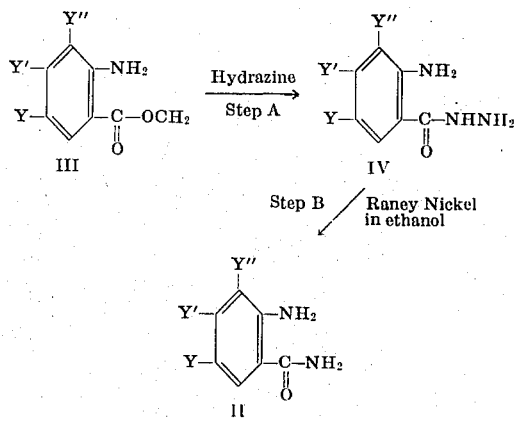

in which Y is as above defined.

The reaction of Step A is of known type and suitably effected at elevated temperatures in the range of 50° C. to 150° C., preferably 80° C. to 130° C. While inert organic solvents of conventional type may be employed it is generally preferred to employ an excess of hydrazine of the solvent for the reaction.

The reaction of Step B is a conventional reduction reaction preferably effected with Raney Nickel in an inert organic solvent. The reaction may be effected at temperatures of from 20° C. to 120° C., preferably 50° C. to 100° C. The solvent employed may be any of several of the inert organic solvents, preferably a lower alkanol such as ethanol or methanol.

The compound of the formula II may also be prepared by reacting a compound of the formula V:

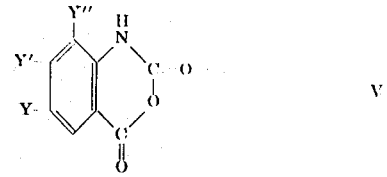

in which Y, Y' and Y" are as defined, with ammonia in the presence of water.

The preparation of a compound II from a compound V is suitably effected at temperatures in the range of from 0° C. to 60° C., preferably 10° C. to 25° C. The reaction is preferably carried out in a suitable solvent and more preferably by employing water as the solvent and ammonium hydroxide as a source of ammonia. The reaction product of the formula II may be isolated from the reaction mixture by working up by established procedures.

The compounds of the formula III and the formula V are either known per se or may be prepared by procedures well known in the art for preparation of known compounds.

The compounds I are useful as anti-inflammatory agents as indicated by an inhibition of Carrageenan induced edema in rats and a reduction in foot volume and an improvement in grip strength in the adjuvant arthritis test in rats using *Mycobacteria butyricum* in Freund's adjuvant. For such use, the compounds may be combined with a pharmaceutically acceptable carrier, and such other conventional adjuvants as may be necessary, and administered orally in such forms as tablets, capsules, elixirs, suspensions and the like or parenterally in the form of an injectable solution or suspension. The dosage administered will, of course, vary depending upon the compound used and the mode of administration. However, in general, satisfactory results are obtained when administered at a daily dosage of from about 0.5 milligrams to about 150 milligrams per kilogram of body weight, preferably given in divided doses two to four times a day, or in sustained release form. For most mammals the administration of from about 40 milligrams to about 1600 milligrams of the compound per day provides satisfactory results and dosage forms suitable for internal administration comprise from about 10 milligrams to about 800 milligrams of the compound in admixture with a solid or liquid pharmaceutical carrier or diluent.

For the above usage, oral administration with carriers may take place in such conventional forms as tablets, dispersible powders, granules, capsules, syrups and elixirs. Such compositions may be prepared according to any method known in the art for the manufacture of pharmaceutical compositions, and such compositions may contain one or more conventional adjuvants, such as sweetening agents, flavoring agents, coloring agents and preserving agents, in order to provide an elegant and palatable preparation. Tablets may contain the active ingredient in admixture with conventional pharmaceutical excipients, e.g., inert diluents such as calcium carbonate, sodium carbonate, lactose and talc, granulating and disintegrating agents, e.g., starch and acid, binding agents, e.g., starch, gelatin and acacia, and lubricating agents, e.g., magnesium stearate, stearic acid and talc. The tablets may be uncoated or coated by known techniques to delay disintegration and adsorption in the gastro-intestinal tract and thereby provide a sustained action over a longer period. Similarly, suspensions, syrups and elixirs may contain the active ingredient in admixture with any of the conventional excipients utilized for the preparation of such compositions, e.g., suspending agents (methylcellulose, tragacanth and sodium alginate), wetting agents (lecithin, polyoxyethylene stearate and polyoxyethylene sorbitan monooleate) and preservatives (ethyl-p-hydroxybenzoate). Capsules may contain the active ingredient alone or admixed with an inert solid diluent, e.g., calcium carbonate, calcium phosphate and kaolin. The preferred pharmaceutical compositions from the standpoint of preparation and ease of administration are solid compositions, particularly hard-filled capsules and tablets.

A representative formulation is a tablet which may be administered four times a day and prepared by conventional tabletting techniques to contain the following ingredients:

| Ingredient | Weight (mg.) |
| --- | --- |
| 1,2,3-benzotriazin-4(3H)-one | 50 |
| Tragacanth | 10 |
| Lactose | 197.5 |
| Corn Starch | 25 |
| Talcum | 15 |
| Magnesium stearate | 2.5 |

The following examples show representative compounds encompassed within the scope of this invention and the manner in which such compounds are prepared. However, it is to be understood that the examples are for purposes of illustration only.

EXAMPLE 1

6-Chloro-1,2,3-benzotriazin-4(3H)-one.

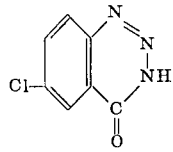

Step A: Preparation of 4-chloro-anthranilamide.

A suspension of 100 g. of 5-chloro-isatoic anhydride in 1250 ml. of dilute ammonium hydroxide solution (prepared from 37 ml. 15.1 N ammonium hydroxide diluted to 1250 ml. with water) was stirred vigorously for 15–20 minutes at room temperature. There is added 2 N. sodium hydroxide solution to pH 11 followed by stirring at room temperature for 15 minutes and filtering. The recovered solid material is washed with water, and dried under vacuum at 60° C. to give 4-chloro-anthranilamide, m.p. 165°–170° C.

Step B: Preparation of 6-chloro-1,2,3-benzotriazin-4(3H)-one.

To suspension prepared by heating together 22.1 g. of 4-chloro-anthranilamide in 130 ml. of n-propanol and 130 ml. of 3N sulfuric acid and then cooling to 0°–5° C. is added dropwise over one-half hour 10.8 g. of sodium nitrite in 80 ml. of water. The resulting mixture is kept at 0°–5° C. for three hours and then allowed to stand overnight at room temperature. The mixture is then diluted with water while stirred vigorously and then filtered to recover the precipitate solids which are washed with water, redissolved in 1.5 liters of boiling chloroform/ethanol (1:1) which is filtered while hot. The filtrate is concentrated in vacuo to obtain 6-chloro-1,2,3-benzotriazin-4(3H)-one, m.p. 195°–196° C.

EXAMPLE 2

1,2,3-Benzotriazin-4(3H)-one.

Step A: Preparation of Anthranilamide.

A suspension of 8.15 g. of isatoic anhydride in 125 ml. dilute ammonium hydride (prepared from 3.7 ml. 15.1 N. ammonium hydroxide diluted with water to 125 ml.) is stirred vigorously for 15 minutes at room temperature. The suspension was filtered, washed with water and the filtrate made basic with 2 N. sodium hydroxide solution. This basic filtrate, after saturating with sodium chloride is extracted several times with ether. The combined ether extracts dried over sodium sulfate and evaporated to obtain anthranilamide, m.p. 108°–110° C.

Step B: Preparation of 1,2,3-Benzotriazin-4(3H)-one.

To a cloudy suspension of 36 g. of anthranilamide in 265 ml. 3 N. sulfuric acid and 795 ml. of n-propanol is added with vigorous stirring at 0°–5° C. 22 g. of sodium nitrite in 105 ml. of water at such a rate that the temperature remained less than 5° C. After stirring the reaction 6 hours, the mixture is left stirring at room temperature overnight. The reaction mixture is diluted with ice water to give a white crystalline material. This is filtered, washed with water and dried under high vacuum at 75° C. to give 1,2,3-benzotriazine-4(3H)-one, m.p. 217°–219° C.

EXAMPLE 3

6,7-Dimethoxy-1,2,3-benzotriazin-4(3H)-one.

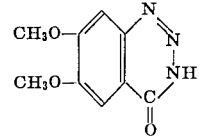

Step A: Preparation of 4,5-dimethoxy-anthranilic acid hydrazide.

A mixture of 50 g. of 4,5-dimethoxymethylanthranilate and 200 ml. of anhydrous hydrazine is refluxed for 30 minutes, and then poured onto ice-water. The resulting mixture containing a grey-white precipitate is filtered and the recovered precipitate washed first with ice-cold water, then with diethyl ether and then dried overnight under high vacuum at 70° C. to obtain 4,5-dimethoxy-anthranilic acid hydrazide, m.p. 176°–177° C.

Step B: Preparation of 4,5-Dimethoxy-anthranilamide. - Dimethoxy-anthranilic

A mixture of 43 g. of 3,4-dimethoxyanthranilic acid hydrazide, 205 g. of water-suspended Raney Nickel and 600 ml. of absolute ethanol is refluxed under nitrogen until the evolution of ammonia ceased (about two hours). The resulting mixture is filtered and the filtrate evaporated in vacuo to dryness. The residue is dissolved in methylene chloride, the solution dried over sodium sulfate and ethanol added to crystallize a material which is washed with diethyl ether to obtain 4,5-dimethoxy-anthranilamide, m.p. 138°–140° C.

Step C: Preparation of 6,7-Dimethoxy-1,2,3-benzotriazin-4(3H)-one.

To a suspension of prepared by heating together 4.0 g. of 4,5-dimethoxy-anthranilamide in 60 ml. of N-propanol and 20 ml. of 3N sulfuric acid and then cooling to 0°–5° C. is added dropwise over one-half hour 1.5 g. of sodium nitrite in 7.0 ml. of water. The resulting mixture is kept at 0°–5° C. for three hours and then allowed to stand overnight at room temperature. The mixture is then diluted with water while stirred vigorously and then filtered to recover the precipitate solids which are washed with water, redissolved in 1.5 liters of boiling chloroform/ethanol (1:1) which is filtered while hot. The filtrate is concentrated in vacuo to obtain 6,7-dimethoxy-1,2,3-benzotriazin-4(3H)-one, m.p. 273°–274° C.

EXAMPLE 4

Following the procedure of Example 3, the following compounds are prepared:
  a. 6,7-methylenedioxy-1,2,3-benzotriazin-4(3H)-one, m.p. 250°–251° C.
  b. 6,7-diethoxy-1,2,3-benzotriazin-4(3H)-one, m.p. 236°–237° C.
  c. 6,7,8-trimethoxy-1,2,3-benzotriazin-4(3H)-one.

EXAMPLE 5

Following the procedure of Examples 1 and 2 the following compound is prepared:

a. 6-nitro-1,2,3-benzotriazin-4(3H)-one.

What is claimed is:

1. The method of treating inflammation in animals comprising administering to an animal afflicted with inflammation a pharmacologically effective amount of a compound of the formula:

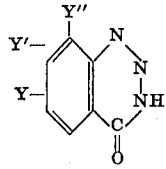

in which Y is hydrogen, halo of atomic weight of from 18 to 80, lower alkoxy or nitro,
each of Y' and Y'' is hydrogen or lower alkoxy;

2. The method of claim 1 in which Y is chloro.
3. The method of claim 1 in which Y is nitro.
4. The method of claim 1 in which each of Y, Y' and Y'' is hydrogen.
5. The method of claim 1 in which at least one of Y, Y' and Y'' is lower alkoxy.
6. The method of claim 5 in which Y and Y' are each methoxy and Y'' is hydrogen.

* * * * *